US012723466B2

(12) United States Patent
Ng

(10) Patent No.: US 12,723,466 B2
(45) Date of Patent: Sep. 1, 2026

(54) MOTOR HEAD COVER FOR A ROLLER SHADE

(71) Applicant: ZMC Metal Coating Inc., Woodbridge (CA)

(72) Inventor: Philip Ng, Thornhill (CA)

(73) Assignee: ZMC Metal Coating Inc., Woodbridge (CA)

( * ) Notice: Subject to any disclaimer, the term of this patent is extended or adjusted under 35 U.S.C. 154(b) by 209 days.

(21) Appl. No.: 18/625,766

(22) Filed: Apr. 3, 2024

(65) Prior Publication Data

US 2024/0344390 A1 Oct. 17, 2024

Related U.S. Application Data

(60) Provisional application No. 63/459,912, filed on Apr. 17, 2023.

(51) Int. Cl.
*E06B 9/42* (2006.01)
*E06B 9/72* (2006.01)

(52) U.S. Cl.
CPC . *E06B 9/42* (2013.01); *E06B 9/72* (2013.01)

(58) Field of Classification Search
CPC ..... E06B 9/42; E06B 9/72; E06B 9/44; E06B 9/70
USPC .............................................................. 52/85
See application file for complete search history.

(56) References Cited

U.S. PATENT DOCUMENTS

D791,839 S * 7/2017 Fox .................................. D15/5
9,840,870 B2 * 12/2017 Lu ............................ E06B 9/40
D821,322 S * 6/2018 Tharol ......................... D13/118
10,890,028 B2 * 1/2021 Anthony ................... E06B 9/44
11,268,322 B2 * 3/2022 Campagna ................ E06B 9/50
D979,685 S 2/2023 Cyrulik
12,252,935 B2 * 3/2025 Menendez ................ E06B 9/44
2011/0011019 A1 * 1/2011 Stahl, Jr. ............... E04B 2/7411 52/309.1
2015/0330144 A1 * 11/2015 Jung ......................... E06B 9/90 474/1
2017/0081916 A1 * 3/2017 Greening .................. E06B 9/42
2022/0120135 A1 4/2022 Botha

FOREIGN PATENT DOCUMENTS

KR 20100113690 A * 10/2010 ............. E06B 9/322
WO WO-2009140711 A1 * 11/2009 ............... E06B 9/42

* cited by examiner

*Primary Examiner* — Beth A Aubrey
(74) *Attorney, Agent, or Firm* — Laurence P. Colton; Smith Tempel Blaha LLC

(57) ABSTRACT

A motor head cover for a roller shade that has an electric motor releasably secured to an end bracket by an insert plate. The motor head cover has a C-shaped body having a mouth opening and an outer circumferential surface. The outer circumferential surface has an inner body surface, an outer body surface, an outer, inwardly directed, side surface, and an inner, inwardly directed, side surface. Each of the side surfaces extend inwardly from the circumferential surface at approximately 90 degrees to collectively form a raceway with the inner body surface. The inner, inwardly directed, side surface is configured to be engaged about a circumferential lip on the insert plate to assist in releasably securing the motor head cover thereto. The inner, inwardly directed side surface, has a series of spaced apart notches that assist in a non-destructive flexure of the motor head cover when securing about the insert plate.

9 Claims, 19 Drawing Sheets

MOTOR HEAD COVER FOR A ROLLER SHADE

BACKGROUND OF THE INVENTION

Technical Field

This invention relates generally to the field of roller shades, and in particular to a motor head cover for a roller shade.

Prior Art

Roller shades, or roller blinds as they are sometimes referred to, have become common forms of window treatments. Roller shades offer privacy, protection from light intrusion, thermal insulation, and can be an aesthetically pleasing addition to a window or other opening in a wall or structure. Commonly, roller shades have been operated by a looped chain or cord that activates a clutch, wherein that pulling on one end of the looped chain or cord causes blind fabric to be deployed from a roller tube, while pulling on the opposite end or looped chain or cord causes blind fabric to be wound back onto the roller tube.

With advances in electronics and electric motor and electric battery technologies, motorized roller shades have become increasingly popular. Motorized roller shades typically employ a small electrical motor that is positioned at or in one end of the roller tube that causes the roller tube to be rotated in a clockwise, or counter clockwise direction. Motorized roller shades have found increasing application in commercial settings, in cases of heavy roller tubes that are either of a significant length or that must receive a significant length of blind fabric and that could be otherwise difficult to operate through the use of a common chain and clutch, in applications that are difficult to physically access, and in high-end or luxury installations.

Unfortunately, the popularity of motorized roller shades has not come without its own set of problems. First, the electrical motors used in the shades can at times be visible and can detract from the overall appearance of the shade. Further, in some instances the control of the electric motor is through a wireless means, necessitating the use of an antenna on the shade which can in some instances detract from the visual appearance of the shade. With a significant number of different manufacturers making electric motors for application in roller shades, blind manufacturers and installers are often faced with having to create or have on hand a variety of different end brackets, each specifically designed to accommodate the electric motor of a particular manufacturer. This not only necessitates that manufacturers stock a large number of different parts, thereby adding to inventory and manufacturing expense, but also requires installers to have both a familiarity with different motor designs and their own inventories of unique end brackets.

BRIEF SUMMARY OF THE INVENTION

Accordingly, in an embodiment the invention concerns a unique motor head cover for use on a roller shade.

The invention further concerns a motor head cover for a roller shade, the roller shade having an electric motor that is releasably secured to an end bracket through use of an insert plate, the motor head cover comprising, a C-shaped body having a mouth opening, the C-shaped body having an outer circumferential surface, the outer circumferential surface comprising an inner body surface and an outer body surface, the C-shaped body having an outer, inwardly directed, side surface, the C-shaped body having an inner, inwardly directed, side surface, each of the side surfaces extending inwardly from the circumferential surface at approximately 90 degrees to collectively form a raceway defined by the respective side surfaces and the inner body surface; wherein the inner, inwardly directed, side surface is configured to be engaged about a circumferential lip on the insert plate to thereby assist in releasably securing the motor head cover to the insert plate; wherein the inner, inwardly directed side surface, comprises a series of spaced apart notches, the notches assisting in a non-destructive flexure of the motor head cover to thereby assist in the releasable securement of the motor head cover about the insert plate.

In an embodiment, the motor head cover comprises a positioning ridge extending from the inner body surface into the raceway, the positioning ridge dimensioned to engage a notch of the lip on the insert plate when the motor head cover is releasably secured thereto, the engagement of the positioning ridge with the notch indexing the motor head cover at a desired position relative to the insert plate.

BRIEF DESCRIPTION OF THE DRAWINGS

For a better understanding of the present invention, and to show more clearly how it may be carried into effect, reference will now be made, by way of example, to the accompanying drawings which show exemplary embodiments of the present invention in which.

DETAILED DESCRIPTION OF PREFERRED EMBODIMENTS

The present invention may be embodied in a number of different forms. The specification and drawings that follow describe and disclose some of the specific forms of the invention.

With reference to the attached drawings, there will now be described a preferred embodiment of the invention.

Figure 1:
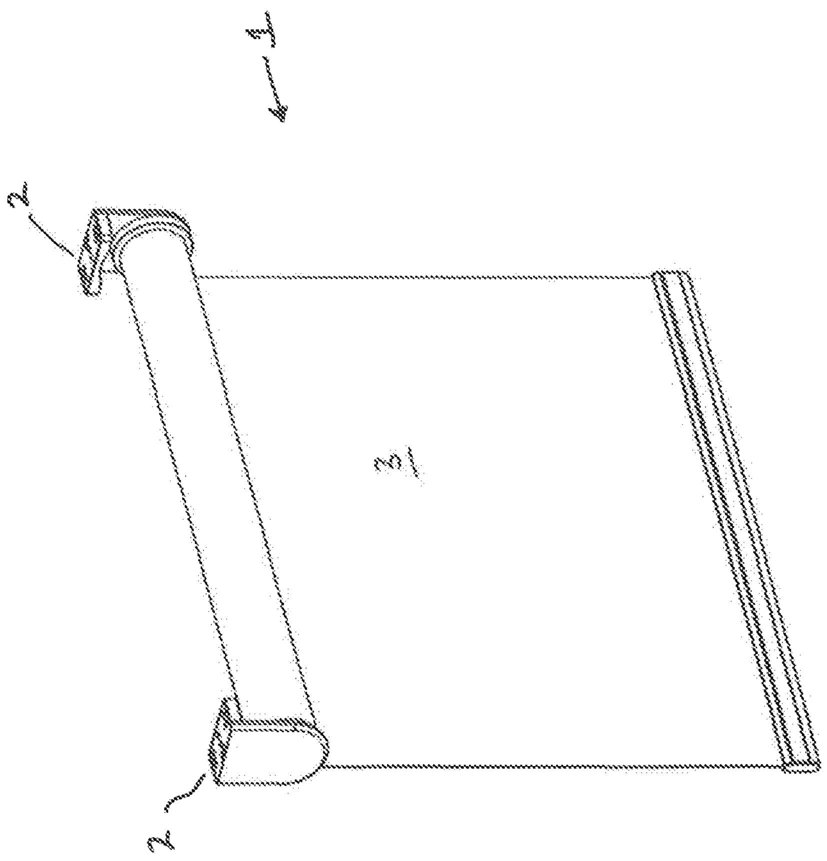
FIG. 1 is an upper side perspective view of a typical motorized roller shade that employs end brackets in accordance with an embodiment of the invention.
Figure 2:
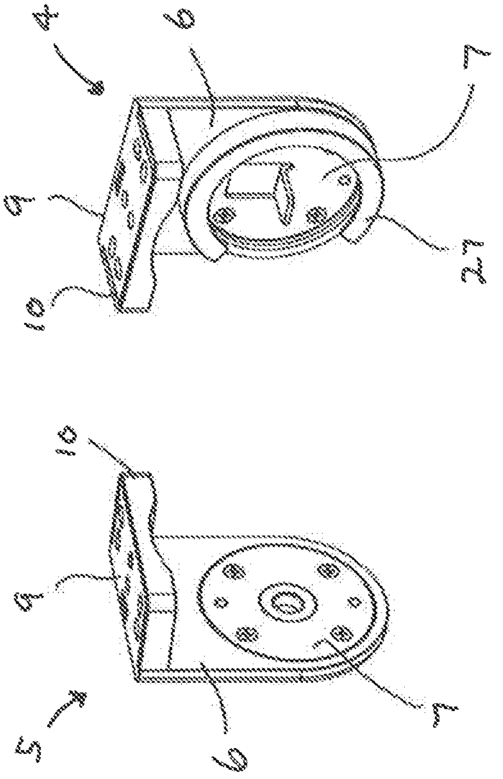
FIG. 2 is a side perspective view of the two end brackets of the roller shade shown in FIG. 1.
Figure 4:
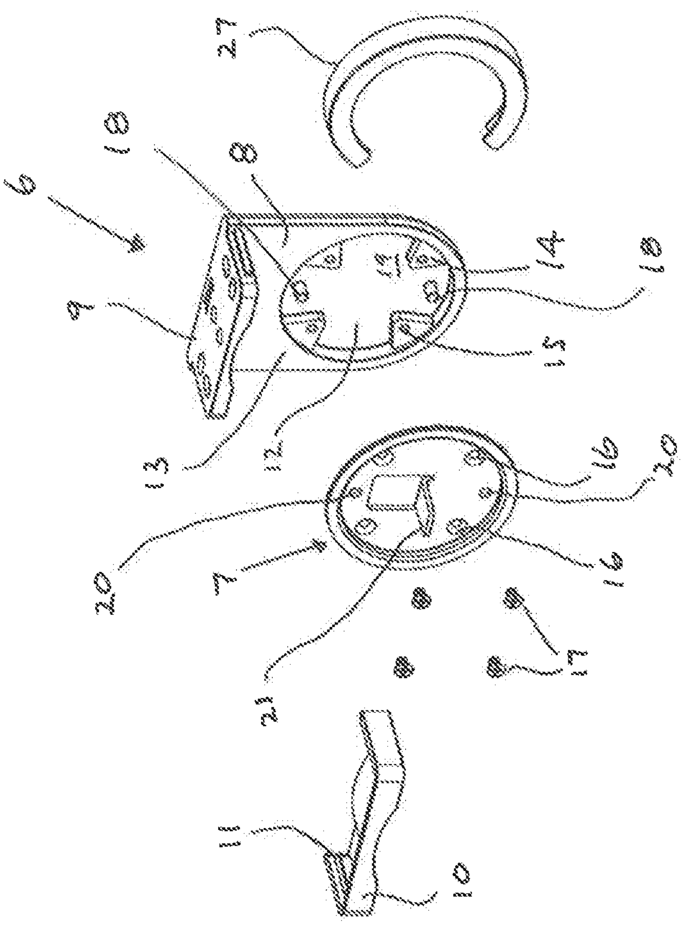
FIG. 4 is an exploded view of the end bracket of FIG. 3.
Figure 3:
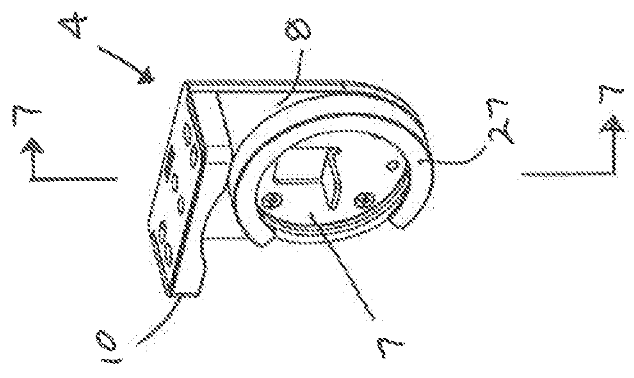
FIG. 3 is a side perspective view of the motor end bracket of the roller shade of FIG. 1.
Figure 7:
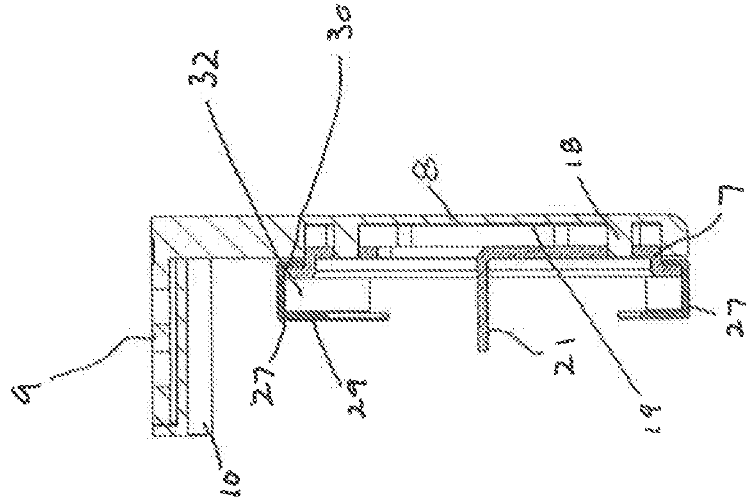
FIG. 7 is a sectional view taken along the line 7-7 of FIG. 3.
Figure 6:
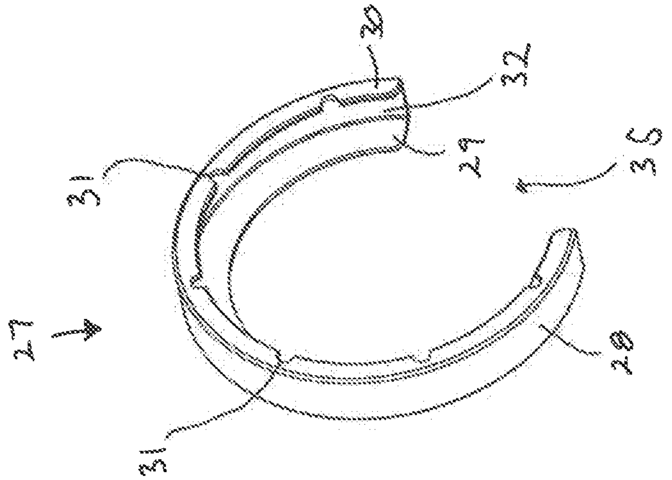
FIG. 6 is an upper rear perspective view of the motor head cover of the end bracket of FIG. 4.
Figure 5:
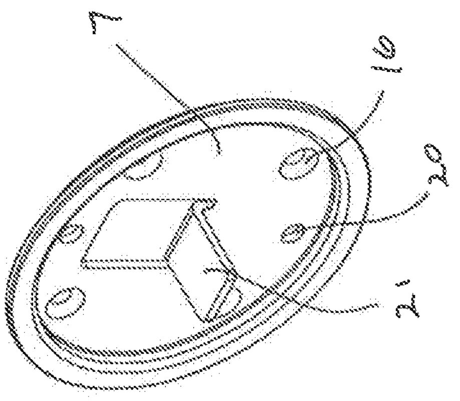
FIG. 5 is a side perspective view of the insert plate of the end bracket of FIG. 4.

FIG. 1 shows a relatively common motorized roller shade 1, comprising a pair of brackets 2 constructed in accordance with an embodiment of the invention and that support a roller blind upon which blind fabric 3 is received. FIG. 2 illustrates the two end brackets 2 in greater detail. The end brackets in FIG. 2 comprise a motor end bracket 4 and an idler end bracket 5. As their names suggest, motor end bracket 4 is designed specifically to receive the "motor end" of a motorized roller tube, while idler end bracket 5 is designed to receive the "idler end" of a motorized roller tube. Further details, structures and configurations of motor end bracket 4 and idler end bracket 5 will now be discussed with specific reference to FIGS. 3 through 17.

In an embodiment of the invention, motor end bracket 4 is comprised generally of a bracket body 6 and an insert plate 7. As will become apparent from the description below, the bracket body 6 of motor end bracket 4 will be the same or universal with the bracket body 6 of idler end bracket 5. Bracket body 6 is itself comprised of a downwardly extending flange 8 and a generally horizontal mounting flange 9, wherein flanges 8 and 9 intersect at approximately a 90 degree angle. In this manner, and as is customary in the art, screws or other fasteners may be inserted through bores in horizontal mounting flange 9 to releasably secure bracket body 6 to the upper surface of a window frame or opening. In an embodiment, motor end bracket 4 may include a mounting screw cover 10 to cover or conceal the mounting screws that extend through horizontal mounting flange 9 in order to present a more "finished" or visually appealing product. Mounting screw cover 10 may be formed from a plastic or similar material and may include lateral retaining rails 11 along each side that engage the side surfaces of horizontal mounting flange 9 in a sliding, friction fit, or "snap" fit manner in order to releasably secure the mounting screw cover to the horizontal flange.

In an embodiment of the invention downward flange 8 includes a recessed receiver 12 within its front surface 13. Recessed receiver 12 will serve the function of receiving and releasably securing insert plate 7 within front surface 13. To that end, in an embodiment of the invention recessed receiver 12 contains a plurality of tabs 14, each containing a threaded bore 15. Insert plate 7 will preferably be formed having a size and shape complementary to recessed receiver 12, such that the insert plate may be placed within receiver 12 with bores 16, that extend through insert plate 7, aligned with threaded bores 15 within tabs 14. In this manner, fasteners 17 may be inserted through bores 16 and threaded into bores 15 to releasably secure insert plate 7 within recessed receiver 12. In the embodiment shown in the attached drawings, recessed receiver 12 contains four threaded tabs, such that four threaded bolts or screws may be used to secure insert plate 7 in place. It will be appreciated that other numbers of tabs and threaded bores, as well as a wide variety of other mechanisms and mechanical structures to releasably secure insert plate 7 within or to downward flange 8 may be utilized.

In an embodiment of the invention downward flange 8 may also include a plurality of pins 18 that are situated within recessed receiver 12 and that extend outwardly from a back or rear surface 19 of downward flange 8. In the depicted embodiment, pins 18 are received through bores or holes 20 within insert plate 7. Pins 18 thus serve the function, when received through bores 20, of orienting insert plate 7 in a manner that ensures alignment of bores 16 with bores 15 within tabs 14 to aid in the insertion of screws or fasteners 17 therethrough. The receipt of pins 18 through bores 20 will also ensure a proper and desired overall orientation of insert plate 7 such that its mechanical features are oriented in the manner required for a complete assembly of the roller shade. As will become apparent from the description below, during operation of the roller shade pins 18 will further perform the function of accommodating torsional load applied to the end bracket by operation of an electric motor used to rotate the roller tube of the roller shade.

In the case of motor end bracket 4, those of skill in the art will appreciate that a portion of the electric motor will need to be fixed in position relative to the end bracket. Commonly, the stator of the motor is held in a fixed relationship relative to the end bracket with the motor's rotor being connected to the roller tube such that rotation of the rotor in one direction or the other causes the roller tube to rotate and blind fabric to be deployed from or rewound onto the roller tube. In one embodiment, insert plate 7 may include a generally horizontally oriented flange or tab 21 that extends outwardly from insert plate 7 and outwardly from downward flange 8. In operation, tab 21 may be received within a slot on the end of the electric motor that is attached to the roller tube and serves to both hang or support the motor, and hence the end of the roller tube, as a means by which torque of the motor (and specifically in most instances the stator) can be transferred from the motor to the end bracket. That is, motor torque is received by tab 21, transmitted to insert plate 7, transferred to downward flange 8, transferred to horizontal mounting flange 9, and then transferred to the window sill or other structure through screws or fasteners that mount the end bracket to the window sill or structure.

It will further be appreciated that the receipt of pins 18 through bores or holes 20 in insert plate 7 will permit the motor torque that is applied to insert plate 7 to be accommodated by pins 18 and not specifically by screws or fasteners 17. To that end, the tolerances between the outside diameter or dimensions of pins 18 may closely match the inside diameter of bores or holes 20. In that manner, motor torque applied to insert plate 7 will largely be accommodated by pins 18 and not transferred to screws or fasteners 17. There will thus be a reduction in the likelihood of insert plate 7 rotationally impacting screws or fasteners 17 and potentially causing damage to the screws or fasteners. Further, in an embodiment, it may be desirable to form bores or holes 16 within insert plate 7 sufficiently large to large to eliminate, reduce, or minimize screws or fasteners 17 contacting the side walls of holes or bores 16. Under that scenario, the "fit" between pins 18 and bores or holes 20 would be such that motor torque applied to insert plate 7 would not enable it to rotate, minimizing or eliminating contact between the sides of bores or holes 16 with screws or fasteners 17. In that manner, there may be a lessened likelihood of vibrational forces applied to the end bracket during operation of the roller shade to potentially cause a loosening of screws or fastener 17 and a reduced likelihood of damage being caused to the fasteners.

Figure 10:
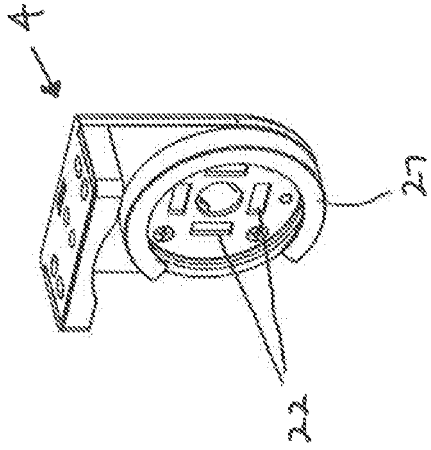
FIG. 10 is a side perspective view of a motor end bracket similar to FIG. 3, but having an alternate insert plate.
Figure 13:
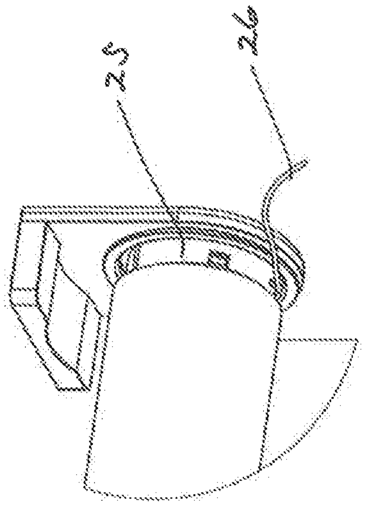
FIG. 13 is an enlarged detailed view of portion "A" of FIG. 12.
Figure 12:
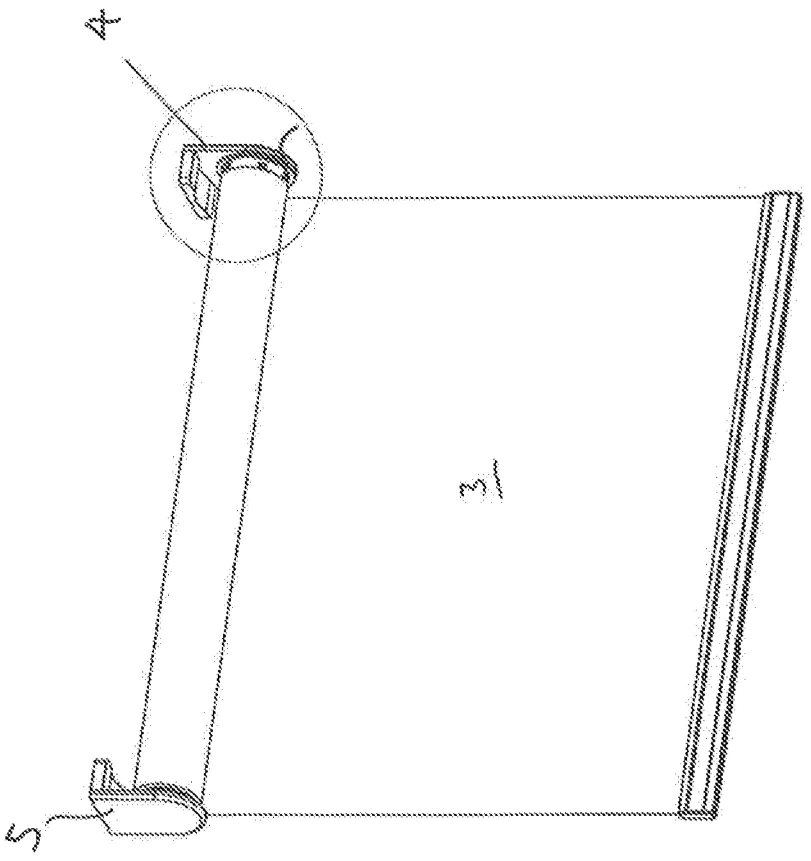
FIG. 12 is a side perspective view of a motorized roller shade demonstrating a typical location of an antenna for wireless control of the motor.
Figure 16:
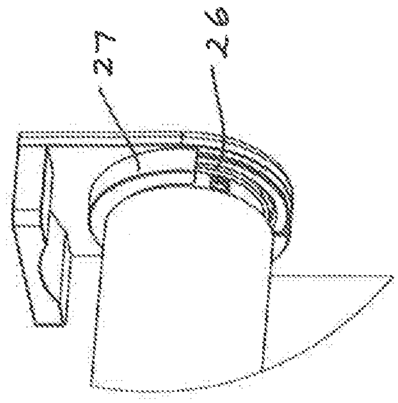
FIGS. 14 through 17 demonstrate the application of a motor head cover, in accordance with an embodiment of the invention, about the end of an electric motor, and the subsequent rotation of the motor head cover after engagement with the motor to conceal an antenna and the outer surface of the motor.

FIG. 10 shows an alternate motor end bracket 4 to that described above, wherein an alternate insert plate 7 has been utilized. In this embodiment, rather than being fitted with a tab 21 that is received within a corresponding slot or opening in the end of an electric motor, insert plate 7 is equipped with a series of rectangular slots 22 into which outwardly extending tabs on the end of the electric motor would be received. The embodiment of motor end bracket 4 shown in FIG. 10 otherwise operates and functions the same as that shown in FIGS. 3 and 4, however, the transference of motor torque will be through the tabs on the end of motor that are received within slots 22, rather than through tab 21 in the case of the embodiment shown in FIGS. 3 and 4.

Figure 9:
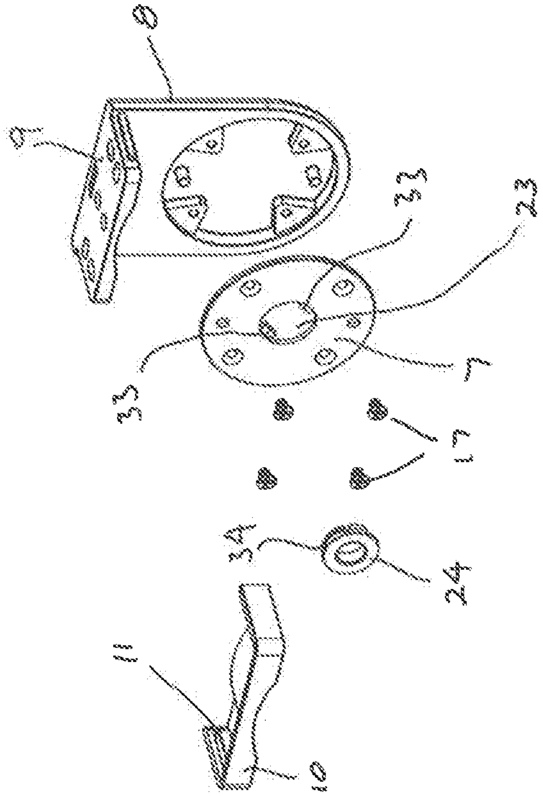
FIG. 9 is an exploded view of the end bracket of FIG. 8.
Figure 8:
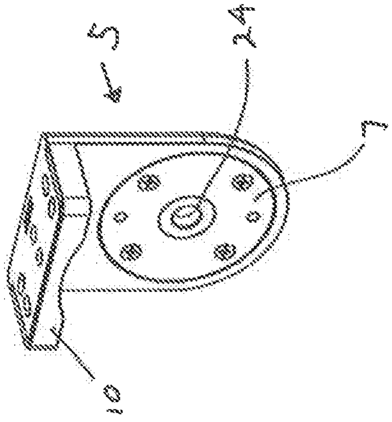
FIG. 8 is a side perspective view of the idler end bracket of the roller shade of FIG. 1.
Figure 11:
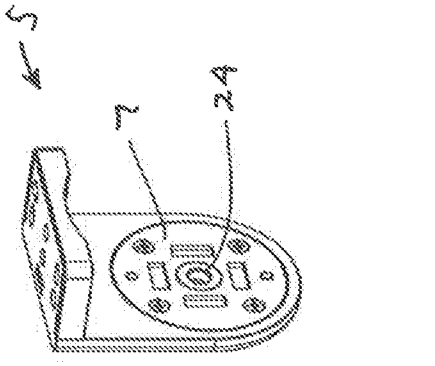
FIG. 11 is a side perspective view of an idler end bracket similar to that of FIG. 8, but having an alternate embodiment of an insert plate.

Referring next to the embodiment shown in FIGS. 8 and 9, here, idler end bracket 5 is shown as having a number of components in common with motor end bracket 4. In particular, idler end bracket 5 includes the same form of bracket body 6 and the same mounting screw cover 10 as in the case of motor end bracket 4. Further, idler end bracket 5 includes an insert plate 7 that is secured within a recessed receiver 12 on downwardly depending flange 8 of bracket body 6 through the use of screws or fasteners 17 that are received through bores 16 in the insert plate and threadably received within bores 15 in a plurality of tabs 14 positioned within recessed receiver 12. Also as in the case of motor end bracket 4, FIG. 9 shows recessed receiver 12 of bracket body 6 including a pair of pins 18 which are received through a pair of correspondingly shaped and sized bores or holes 20 within insert plate 7.

A primary difference in insert plate 7 utilized within idler end bracket 5 is the incorporation of a central hole or opening 23 which may receive idler bushing 24. In the case of the embodiment shown, hole 23 includes a pair of inwardly directed tabs 33 that engage a circumferential groove 34 around the outside diameter of idler bushing 24 in order to create a "snap-fit" connection between the idler bushing and insert plate 7. It will, however, be appreciated that a wide variety of other means or mechanical mechanisms to retain the idler bushing in place could equally be used. It will further be appreciated that in an alternate embodiment the idler bushing may be an integral part of insert plate 7, or may include actual bearings received within a bearing race. Regardless of its particular structure, it will be appreciated and understood by one of ordinary skill that securing insert plate 7 to idler end bracket 5 will be accomplished in the same manner as an insert plate is secured to motor end bracket 4. With the insert plate secured to the idler end bracket an outwardly extending shaft on an idler end fitting that is received within one end of the roller tube can be received within the bore within idler bushing 24 to suspend the end of the roller tube from bracket 4 and to present a low friction mechanism that readily allows for rotation of the roller tube.

With particular reference to FIGS. 6, 7, and 12 through 17, as noted above, in the case of many motor powered roller shades the motor is controlled remotely by means of a wireless transmitter. To accomplish the receipt of wireless command transmissions, a motor 25 of roller shade 1 will typically include an external antenna 26. Commonly, antenna 26 is a flexible wire that extends outwardly from motor 25.

In an embodiment of the invention there is further provided a motor head cover 27 which may have a generally "C-shape" configuration, with an outer circumferential surface 28 having an inner body surface and an outer body surface. C-shaped motor head cover 27 may include a pair of inwardly directed side surfaces 29 and 30 (which may comprise an outer, inwardly directed, side surface 29 and an inner, inwardly directed, side surface 30), meeting circumferential surface 28 at approximately 90 degrees. A raceway 32 is formed between side surfaces 29 and 30, and adjacent to the interior surface of circumferential surface 28. A C-shaped configuration for motor head cover 27 accommodates a motor having a circular exterior. Other configurations for motor head cover 27 are contemplated for different shaped motors. Preferably, motor head cover 27 is formed from a flexibly resilient material such that it can be "snapped" over the exterior surface of motor 25 and retained thereabout. The receipt of motor head cover 27 about the exterior of motor 25 may be such that there is presented the ability for motor head cover 27 to be rotated while in place in order to cover or obscure a desired portion of the exterior of the motor, depending on the particular application at hand and the direction of common view by an observer. Further, as demonstrated graphically in FIGS. 14 through 17, motor head cover 27 may be rotated about the exterior of motor 25 in a manner that permits antenna 26 to be received within raceway 32, and between cover 27 and the motor, thus also obscuring the antenna from view. To that end, in an embodiment, motor head cover 27 is dimensioned so that there is a sufficient offset between the interior surface of circumferential surface 28 and the outside diameter of motor 25, so as to readily permit the receipt of antenna 26 therebetween.

Figure 15:
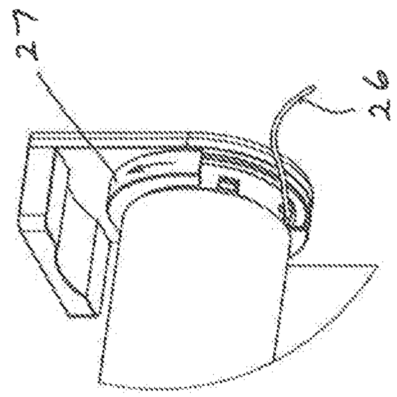
Figure 14:
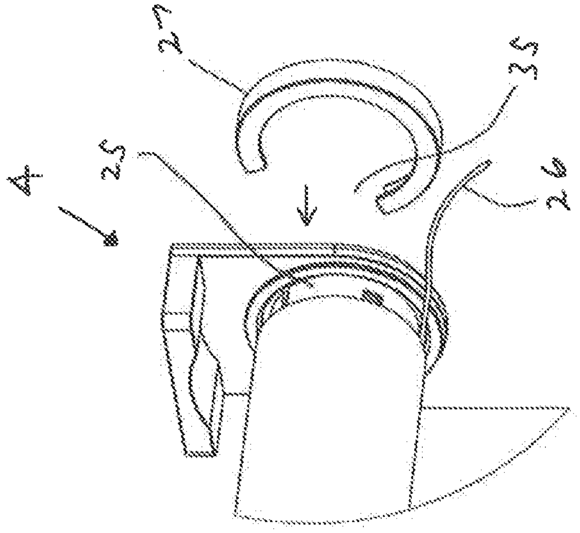
Figure 17:
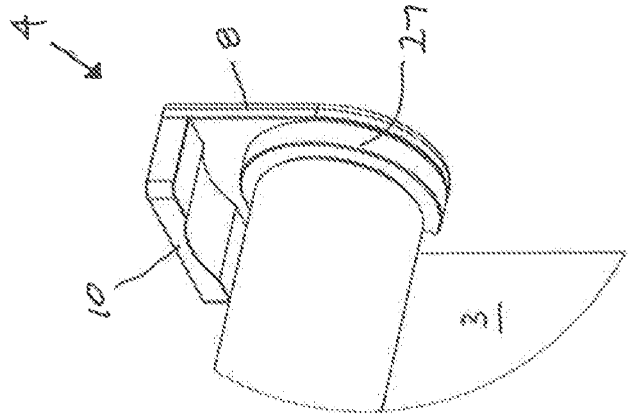
Figure 19:
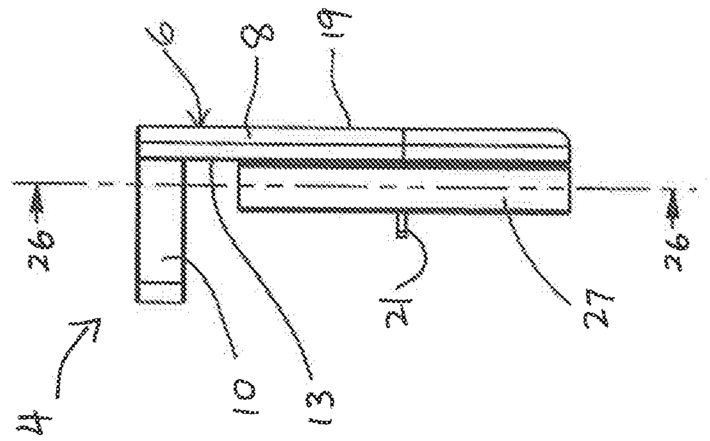
FIG. 19 is a side view of the motor end bracket of FIG. 18.
Figure 18:
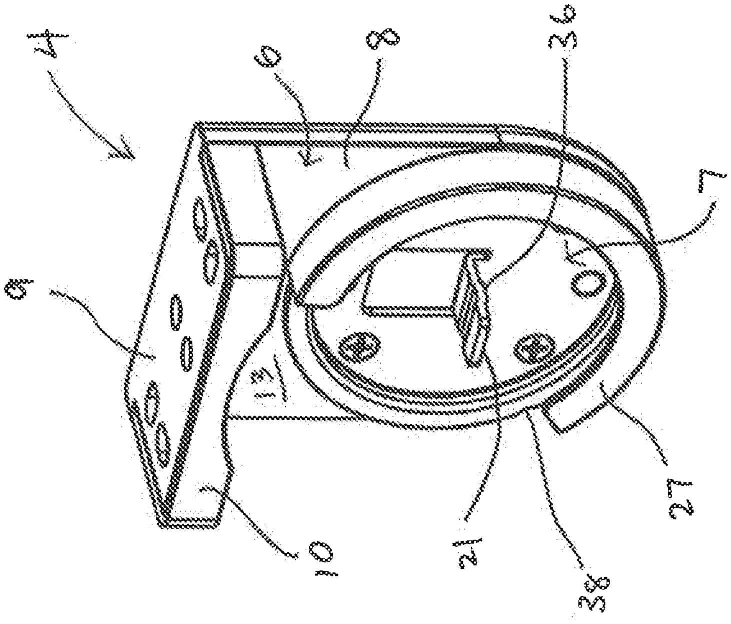
FIG. 18 is a side perspective view of a motor end bracket similar to FIG. 3, but having a further alternate insert plate and an alternate motor head cover.
Figure 20:
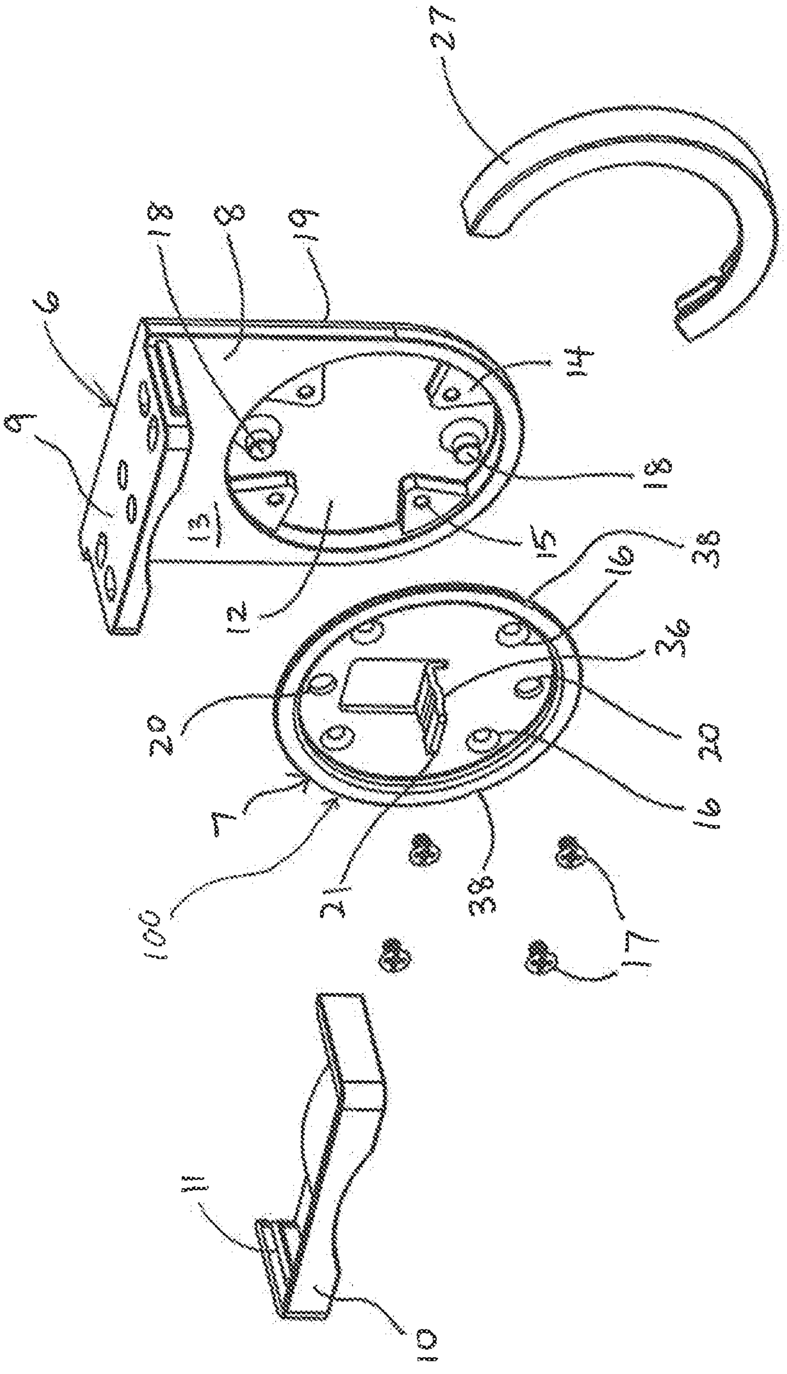
FIG. 20 is an exploded view of the motor end bracket of FIG. 18.
Figure 21:
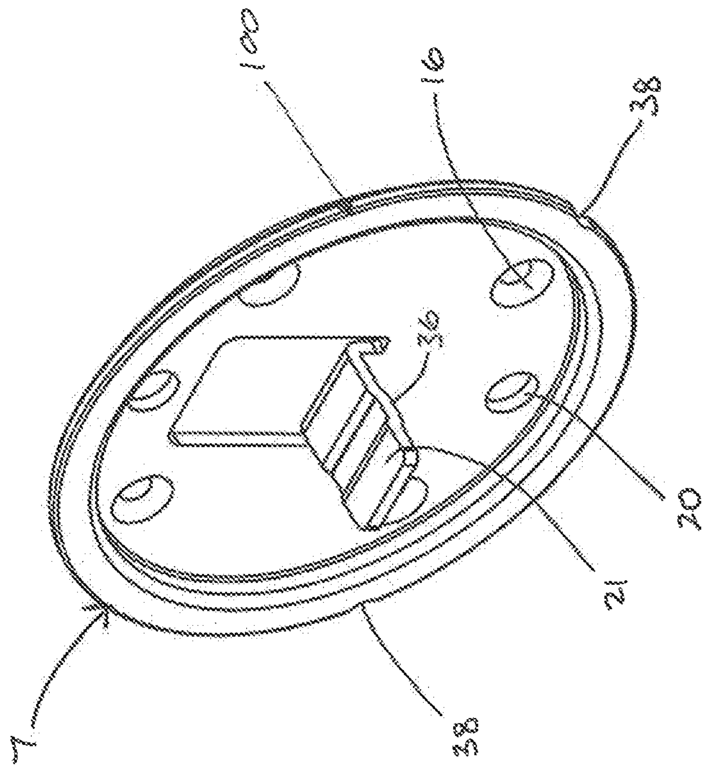
FIG. 21 is a side perspective view of the further alternate insert plate of the motor end bracket of FIG. 20.
Figure 23:
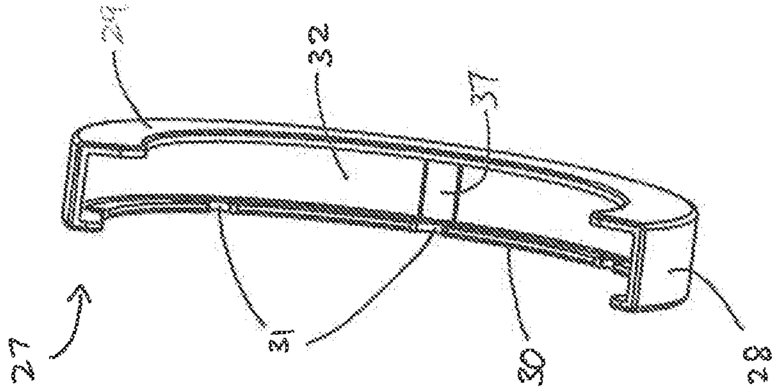
FIG. 23 is a side perspective view of the alternate motor head cover of FIG. 22.
Figure 22:
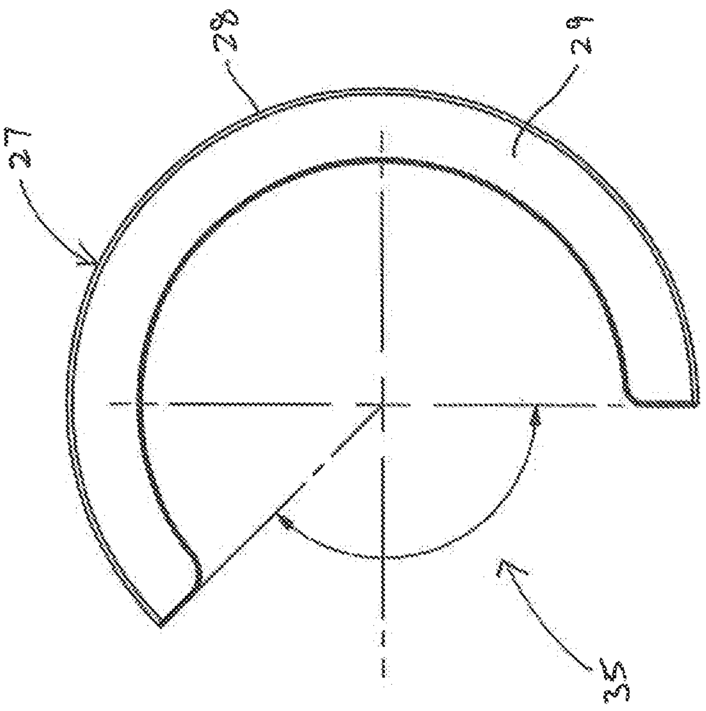
FIG. 22 is a side view of the alternate motor head cover of FIG. 18 in isolation.
Figure 25:
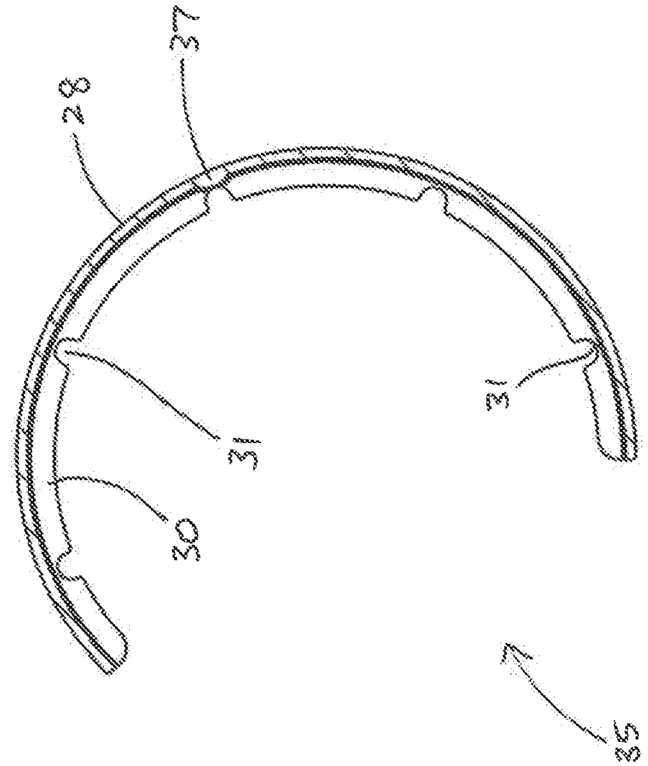
FIG. 25 is a sectional view taken along the line 25-25 of FIG. 24.
Figure 24:
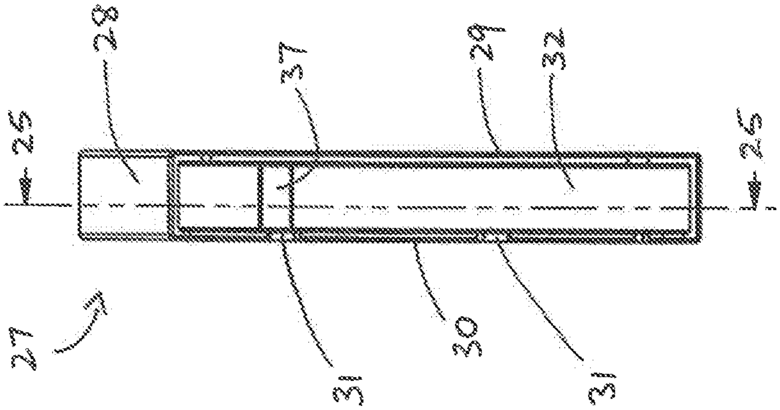
FIG. 24 is a rear view of the alternate motor head cover of FIG. 22.
Figure 27:
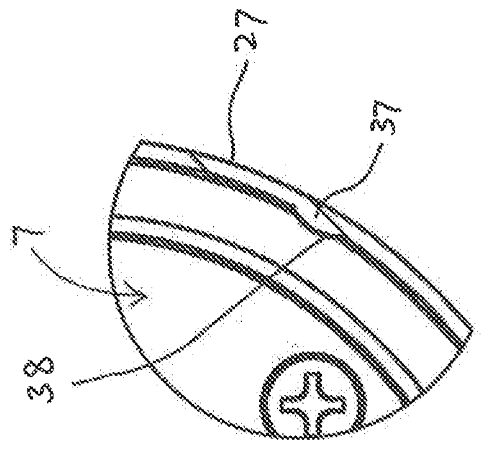
FIG. 27 is an enlarged detailed view of portion "B" of FIG. 26.
Figure 26:
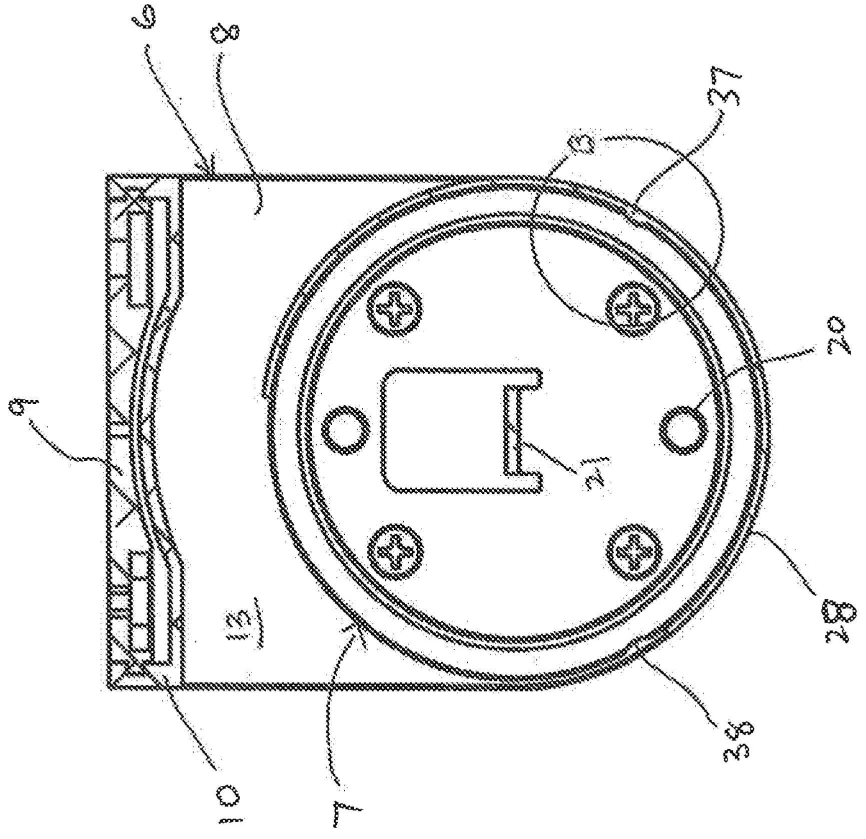
FIG. 26 is a sectional view along line 26-26 of FIG. 19.

With specific reference to FIGS. 14 through 17, when the motor end of the roller shade has been secured to motor end bracket 4, motor head cover 27 can be aligned with the outer portion of motor 25 such that compressing motor head cover 27 against the surface of the motor (in the direction of the arrow in FIG. 14) will open or expand mouth or opening 35 in motor head cover 27 allowing the cover to be received over the exterior surface of motor 25. As shown in FIG. 15, with motor head cover 27 in place, it can be rotated (see the arrow in FIG. 15) to permit antenna 26 to be received within raceway 32. Once the antenna is received within raceway 32 (see FIG. 16) motor head cover 27 can then be rotated in an opposite direction to conceal both the antenna and the exterior surface of motor 25 (see FIG. 17).

The structure of motor head cover 27 thus presents a means by which the exterior surface of the motor and the exterior antenna can be obscured from view. Motor head cover 27 also presents a means by which the antenna can be protected, with the antenna held in a position where it cannot be contacted by or interfere with the winding or unwinding of blind fabric upon the roller tube, and where it is not subjected to damage when dirt or debris is removed from the roller blind by dusting or vacuuming.

To facilitate the receipt of motor head cover 27 about the exterior surface of motor 25, in an embodiment of the invention inner side surface 30 of motor head cover 27 may be discontinuous along its length through the incorporation of a series of spaced apart notches 31 extending through the side surface. In this embodiment, side surface 30 will be the exterior of the two side surfaces and the surface that will be immediately adjacent to downward flange 8 when in use. It will therefore be appreciated that notches 31 will not be visible when motor cover 27 is in place. However, it will also be appreciated that the incorporation of a series of spaced depart notches 31 along the length of side surface 30 will enhance the ability of motor head cover 27 to non-destructively flex, and permit mouth or opening 35 to more easily expand such that it can be received about the exterior surface of motor 25. Without notches 31, motor head cover 27, in cross section, essentially becomes a "C-channel" which is inherently structurally rigid. The incorporation of notches 31 enhances the flexure of motor head cover 27 and thus allows it to be more easily "snapped" into the position about the exterior of the motor. The same unique structure allows motor head cover 27 to be more easily removed for blind and motor servicing purposes. The use of notches 31 may further enhance the ability to manufacture motor head cover 27 from a wider variety of materials as some of the flexure of the cover can be accommodated by notches 31 such that the flexure need not necessarily be solely a function of the material itself.

It will thus be appreciated from an understanding of the above described invention that there is provided a roller shade end bracket that is particularly useful in the case of motorized roller shades. A universal bracket body can be easily and readily adapted for use on either a motor end or idler end of the motorized roller shade. Simply utilizing the appropriate insert plate for attachment to the bracket body is all that is required in order to "customize" the end bracket for particular use on either the motor or the idler end. The same bracket body with the appropriate insert plate can accommodate motor torque if used at the motor end of the blind, and can equally be adapted for use at the idler end by simply installing an insert plate designed to accommodate the idler end fitting of the blind. Common mounting screw covers can be used to obscure the mounting fasteners of the end bracket regardless of whether it is a motor or idler end bracket.

Further, the use of dedicated pins 18 that are received through dedicated bores or holes 20 in insert plate 7 presents a means to more effectively accommodate motor torque than currently available end brackets, which in some cases utilize teeth that can potentially slip. With motor torque accommodated by pins 18, bores or holes 16 within insert plate 7 can be over-sized to eliminate or minimize screws or fasteners 17 contacting the side walls of holes or bores 16, thereby reducing potentially damaging the screws or fasteners as well has helping to reduce the likelihood of a loosening of the screws or fasteners through vibration.

Where the end bracket is used at the motor end, a unique motor head cover can easily be snapped in place over the end of the motor. The unique motor head cover is constructed in a manner that permits a concealment of both the exterior portion of the motor that would otherwise be visible, and the concealment and protection of the motor's control antenna.

Figure 30:
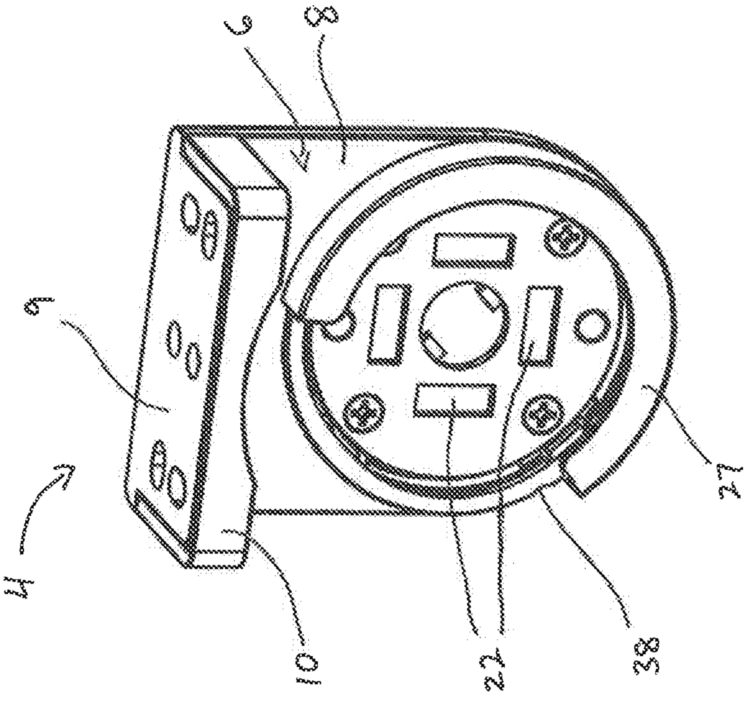
FIG. 30 is a side perspective view of a motor end bracket similar to FIG. 3, but having a yet further alternate insert plate and the alternate motor head cover of FIG. 18.
Figure 31:
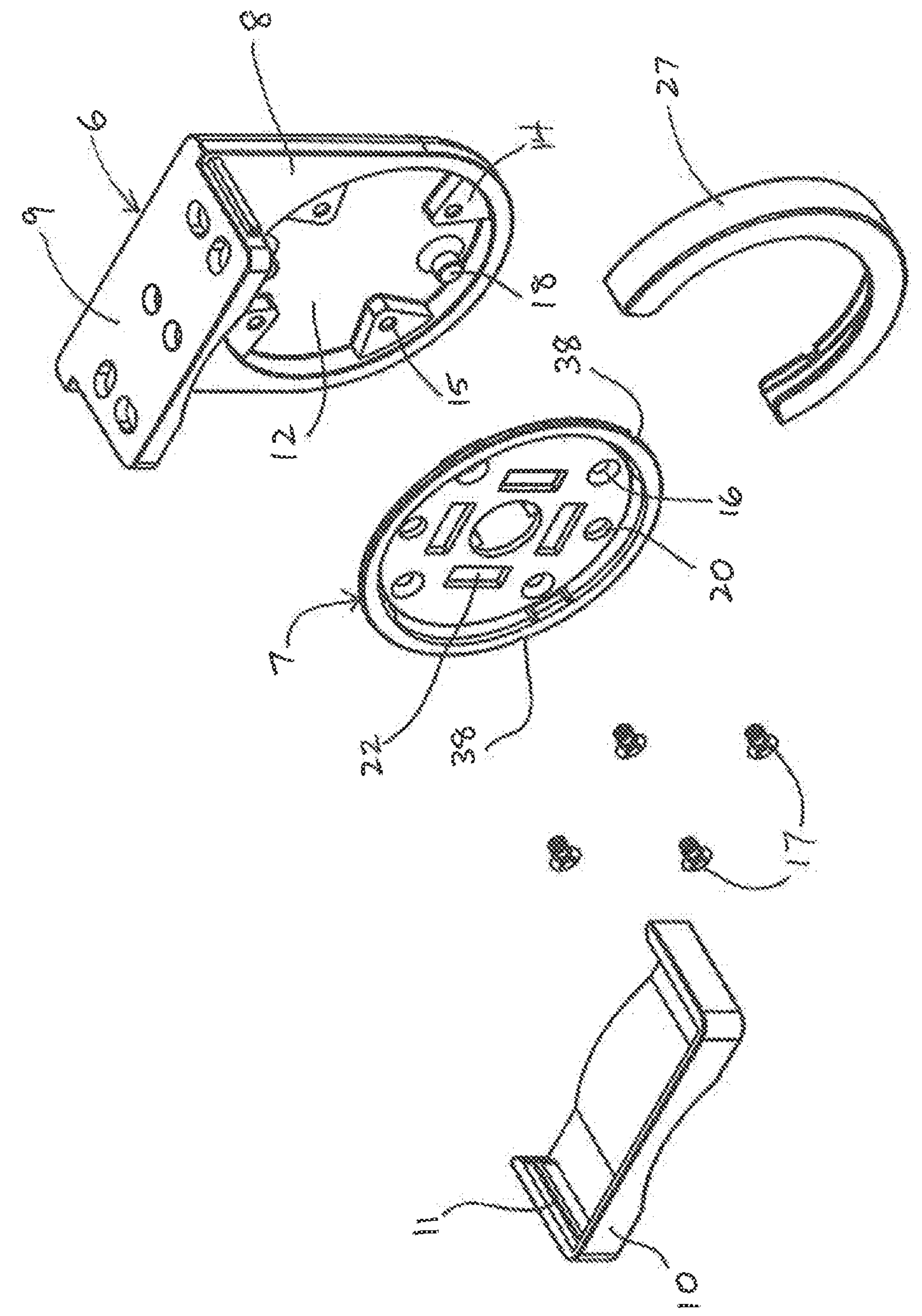
FIG. 31 is an exploded view of the motor end bracket of FIG. 30.
Figure 34:
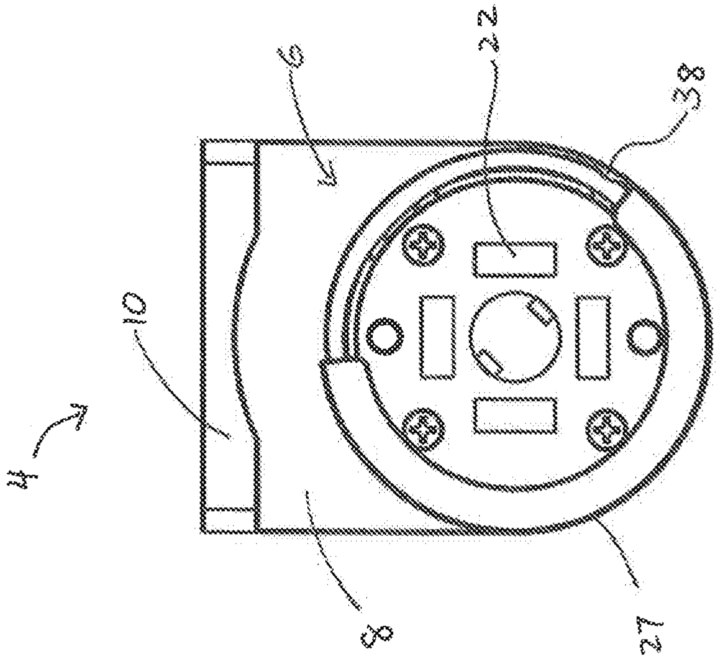
FIG. 34 is a front view of the motor end bracket of FIG. 31 in a second configuration.
Figure 33:
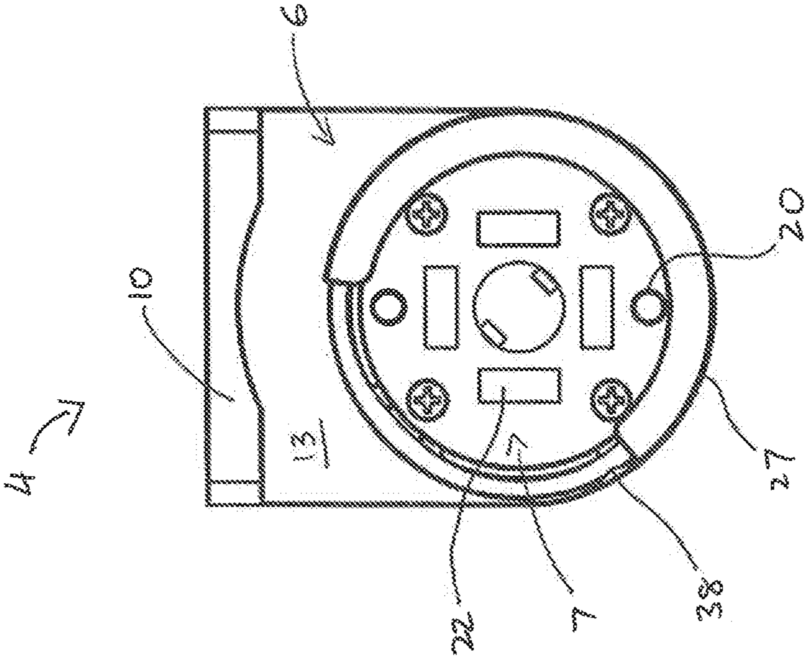
FIG. 33 is a front view of the motor end bracket of FIG. 31 in a first configuration.

FIGS. 18 to 21 show a further, alternate, motor end bracket 4, wherein an alternate insert plate 7 and an alternate motor head cover 27 have been utilized. In this embodiment, tab 21 (that is received within a corresponding slot or opening in the end of an electric motor) includes a lateral ridge or crease 36 to increase a thickness of tab 21 and/or to help provide further structural rigidity to tab 21. The presence of ridge 36 may also help tab 21 to better adapt to and couple with various slots (having varying heights) of the electric motor. While ridge 36 is shown in the attached figures to be a single downwardly directed crease or lateral ridge, it may comprise more than a single ridge or crease, may be directed upwardly and/or may have a different shape than that shown in the figures. The embodiment of motor end bracket 4 shown in FIG. 30 otherwise operates and functions similar to that shown in FIGS. 3 and 4, where the transference of motor torque will be through tab 21.

In the embodiment of FIGS. 18-21, insert plate 7 also includes a plate notch 38 positioned on an outer circumferential lip 100 that extends around its perimeter. In particular, the embodiment that is depicted in FIGS. 18 to 21 shows insert plate 7 having two plate notches 38 positioned on its lip, with one plate notch 38 positioned approximately 120 degrees from the other, and generally below tab 21. In alternative applications, insert plate 7 may have more than two plate notches 38 positioned on lip 100. Plate notches 38 may also be positioned at different locations or degrees relative to one another, and may be positioned beside or above tab 21. As is discussed in further detail below, each plate notch 38 of insert plate 7 cooperates with motor head cover 27 to hold the motor head cover in place relative to insert plate 7.

FIGS. 22-27 show an alternate motor head cover 27, which may largely be similar to motor head cover 27 as described above and shown in FIG. 6. In the embodiment of FIGS. 22-27, similar to motor head cover 27, mouth 35 of motor head cover 27 may be between 130 to 140 degrees. In an embodiment, mouth 35 may have an opening that is approximately 135 degrees. One of ordinary skill in the art will appreciate that other degrees of the opening of mouth 35 are possible and contemplated.

Motor head cover 27 shown in FIGS. 22-27 has a positioning ridge 37 positioned within raceway 32 between side surfaces 29 and 30, and extending from the interior surface of circumferential surface 28. Positioning ridge 37 may be dimensioned to be received within one of the plate notches 38 of insert plate 7. In the particular embodiment depicted in FIGS. 23 to 25, positioning ridge 37 is positioned approximately halfway along circumferential surface 28 of motor head cover 7.

Figure 29:
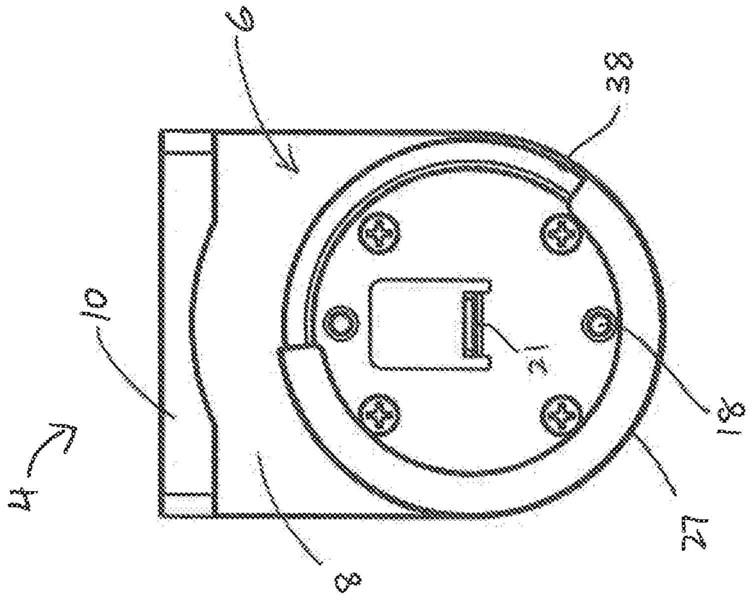
FIG. 29 is a front view of the motor end bracket of FIG. 19 in a second configuration.
Figure 28:
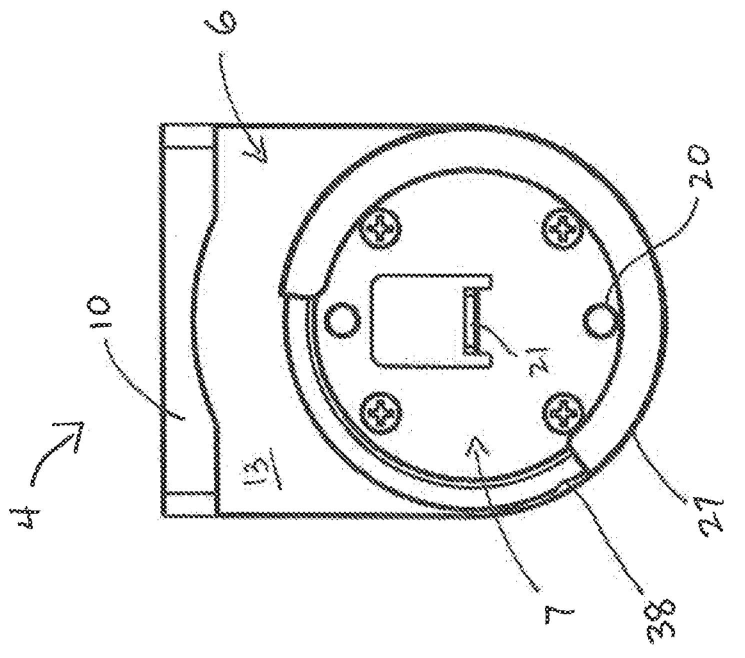
FIG. 28 is a front view of the motor end bracket of FIG. 19 in a first configuration.
Figure 32:
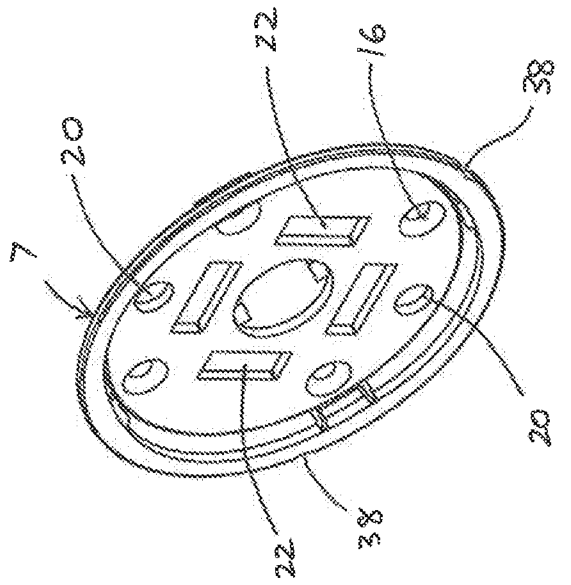
FIG. 32 is a side perspective view of the yet further alternate insert plate of the motor end bracket of FIG. 31.

As described immediately above, the receipt of motor head cover 27 about the exterior of motor 25 may be such that there is presented the ability for motor head cover 27 to be rotated while in place in order to cover or obscure a desired portion of the exterior of the motor, depending on the particular application at hand and the direction of common view by an observer. When positioning ridge 37 is received within one of the plate notches 38, the resulting coupling helps to maintain the position of motor head cover 27 in relation to insert plate 7, and helps to prevent motor head cover 27 from simply spinning around the motor 25. This is demonstrated graphically in FIGS. 28 to 29. FIG. 28 illustrates a first configuration of insert plate 7 where positioning ridge 37 is received within one of the (i.e. right) plate notch 38. This configuration obscures the exterior of the motor from a lower right-side view. FIG. 29 illustrates a second configuration of insert plate 7 where positioning ridge 37 is received within the other of the plate notches 38 (i.e. left side). This configuration obscures the exterior of the motor from a lower left-side view. If a different portion of the motor is to be obscured from view, plate notches 38 may be positioned at different locations or degrees along the circumference of insert plate 7 and/or positioning ridge 37 may be positioned at a different location within raceway 32.

FIGS. 30 to 34 show a yet further alternate motor end bracket 4, wherein a yet further alternate insert plate 7 and alternate motor head cover 27 have been utilized. This embodiment is largely similar to insert plate 7 shown in FIG. 10, with the addition of plate notches 38 positioned at the perimeter of insert plate 7. Here motor end bracket 4 operates in a similar manner to that described above with respect to FIG. 10, but with positioning ridge 37 and plate notches 38 helping to maintain the position of motor head cover 27 in relation to insert plate 7 (to help to prevent motor head cover 27 from simply spinning around the motor 25).

It is to be understood that what has been described are the preferred embodiments of the invention. The scope of the claims should not be limited by the preferred embodiments set forth above, but should be given the broadest interpretation consistent with the description as a whole.

I claim:

1. A motor head cover for a roller shade, the roller shade having an electric motor that is releasably secured to an end bracket through use of an insert plate releasably secured to the end bracket, the motor head cover comprising, a C-shaped body having a mouth opening, the C-shaped body having an outer circumferential surface, the outer circumferential surface comprising an inner body surface and an outer body surface, the C-shaped body having an outer, inwardly directed, side surface, the C-shaped body having an inner, inwardly directed, side surface, each of the side surfaces extending inwardly from the circumferential surface at approximately 90 degrees to collectively form a raceway defined by the respective side surfaces and the inner body surface;

wherein the inner, inwardly directed, side surface is configured to be engaged about a circumferential lip on the insert plate to thereby assist in releasably securing the motor head cover to the insert plate; and wherein the inner, inwardly directed side surface, comprises a series of spaced apart notches, the notches assisting in a non-destructive flexure of the motor head cover to thereby assist in the releasable securement of the motor head cover about the insert plate.

2. The motor head cover of claim 1, further comprising a positioning ridge extending from the inner body surface into the raceway, the positioning ridge dimensioned to engage a notch of the lip on the insert plate when the motor head cover is releasably secured thereto, the engagement of the positioning ridge with the notch indexing the motor head cover at a desired position relative to the insert plate.

3. The motor head cover of claim 2 formed from flexibly resilient material to permit flexure of the C-shaped body such that it can be snapped over the lip of the insert plate and retained thereabout.

4. The motor head cover of claim 2, wherein the mouth opening is between 130 and 140 degrees.

5. The motor head cover of claim 2, wherein the positioning ridge comprises at least two positioning ridges on the inner body surface permitting alternate positioning of the motor head cover relative to the insert plate through engagement of different positioning ridges with the notch of the lip of the insert plate.

6. The motor head cover of claim 2, wherein the notch of the lip of the insert plate comprises two or more notches permitting alternate positioning of the motor head cover relative to the insert plate through engagement the positioning ridge with different notches of the lip of the insert plate.

7. The motor head cover of claim 2, wherein the positioning ridge comprises at least two positioning ridges on the inner body surface, and wherein the notch of the lip of the insert plate comprises two or more notches, and wherein alternate positioning of the motor head cover relative to the insert plate occurs through engagement of a designated positioning ridge with a designated notch of the lip of the insert plate.

8. The motor head cover of claim 5, wherein the positioning ridge comprises two positioning ridges off-set from one another by 120 degrees.

9. The motor head cover of claim 6, wherein the two or more notches comprise two notches off-set from one another by 120 degrees.

* * * * *